(12) United States Patent
Yoshioka et al.

(10) Patent No.: US 12,063,642 B2
(45) Date of Patent: Aug. 13, 2024

(54) COMMUNICATION APPARATUS AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 280 days.

(21) Appl. No.: 17/606,959

(22) PCT Filed: Apr. 30, 2019

(86) PCT No.: PCT/JP2019/018175
§ 371 (c)(1),
(2) Date: Oct. 27, 2021

(87) PCT Pub. No.: WO2020/022267
PCT Pub. Date: Nov. 5, 2020

(65) Prior Publication Data
US 2022/0217741 A1    Jul. 7, 2022

(51) Int. Cl.
*H04W 72/1263*    (2023.01)
*H04L 5/00*    (2006.01)
(Continued)

(52) U.S. Cl.
CPC ....... *H04W 72/1263* (2013.01); *H04L 5/0053* (2013.01); *H04W 72/02* (2013.01);
(Continued)

(58) Field of Classification Search
CPC ............. H04W 72/1263; H04W 72/02; H04W 72/0446; H04W 72/542; H04W 72/569;
(Continued)

(56) References Cited

U.S. PATENT DOCUMENTS 11,936,482 B2    3/2024 Zhao
2019/0036652 A1    1/2019 Baghel et al.
(Continued)

FOREIGN PATENT DOCUMENTS

CN    109792369 A    5/2019
JP    2018-029323 A    2/2018

OTHER PUBLICATIONS

International Search Report issued in PCT/JP2019/018175 on Jun. 18, 2019 (5 pages).
(Continued)

*Primary Examiner* — Abdullahi Ahmed
(74) *Attorney, Agent, or Firm* — Osha Bergman Watanabe & Burton LLP

(57) ABSTRACT

A communication apparatus includes a receiving unit configured to receive data on a sidelink shared channel; a control unit configured to generate acknowledgement information about the received data; and a transmitting unit configured to, upon detecting that a first elapsed time from receiving the data by the receiving unit until a timing for transmitting the acknowledgement information via a sidelink is shorter than a first reference time, defer the timing for transmitting the acknowledgement information via the sidelink until the first elapsed time becomes longer than or equal to the first reference time.

6 Claims, 21 Drawing Sheets

(51) Int. Cl.
  *H04W 72/02* (2009.01)
  *H04W 72/0446* (2023.01)
  *H04W 72/542* (2023.01)
  *H04W 72/566* (2023.01)

(52) U.S. Cl.
  CPC ..... *H04W 72/0446* (2013.01); *H04W 72/542* (2023.01); *H04W 72/569* (2023.01)

(58) Field of Classification Search
  CPC .... H04W 92/18; H04L 5/0053; H04L 1/0026; H04L 1/0027; H04L 1/1848; H04L 1/1854
  See application file for complete search history.

(56) References Cited

U.S. PATENT DOCUMENTS

| | | | | |
|---|---|---|---|---|
| 2019/0173612 | A1* | 6/2019 | Kimura | H04L 1/0063 |
| 2020/0374978 | A1* | 11/2020 | Panteleev | H04W 88/04 |
| 2021/0028891 | A1* | 1/2021 | Zhou | H04W 4/40 |
| 2021/0152408 | A1* | 5/2021 | Yeo | H04L 5/0053 |
| 2021/0168762 | A1* | 6/2021 | Huang | H04W 72/0446 |
| 2021/0321396 | A1* | 10/2021 | Li | H04L 1/1896 |
| 2022/0393836 | A1* | 12/2022 | Wirth | H04W 76/15 |
| 2023/0087401 | A1* | 3/2023 | Shin | H04L 5/0037 370/329 |
| 2023/0111565 | A1* | 4/2023 | Lee | H04W 72/12 370/329 |
| 2023/0262765 | A1* | 8/2023 | Zhou | H04W 72/02 370/329 |

OTHER PUBLICATIONS

Written Opinion of the International Searching Authority issued in PCT/JP2019/018175 on Jun. 18, 2019 (5 pages).
3GPP TS 38.214 V15.5.0; "3rd Generation Partnership Project; Technical Specification Group Radio Access Network; NR; Physical layer procedures for data (Release 15)"; Mar. 2019 (103 pages).
Office Action issued in the counterpart Chinese Application No. 201980095857.7, mailed Jun. 8, 2023 (15 pages).
Extended European Search Report issued in counterpart European Application No. 19927228.7 mailed on Oct. 14, 2022 (11 pages).
Vivo; "Discussion on mode 1 resource allocation mechanism"; 3GPP TSG RAN WG1 #96bis, R1-1904073; Xi'an, China; Apr. 8-12, 2019 (9 pages).
Office Action issued in counterpart European Patent Application No. 19 927 228.7 mailed on Sep. 20, 2023 (9 pages).
H. Huawei; "Frame and slot structure for sidelink"; 3GPP TSG RAN WG1 Meeting #96bis, R1-1904687; Xi'an, China; Apr. 8-12, 2019 (5 pages).
Office Action issued in Chinese Application No. 201980095857.7, mailed Mar. 30, 2024 (19 pages).

* cited by examiner

COMMUNICATION APPARATUS AND COMMUNICATION METHOD

TECHNICAL FIELD

The present invention relates to a communication apparatus and a communication method in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which communication apparatuses, such as a user equipment (UE), perform communication directly with each other without going through a base station.

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.214 V15.5.0 (2019-03)

SUMMARY OF THE INVENTION

Problem to be Solved by the Invention

With regard to NR-Uu, the processing time in a user equipment is defined. In an NR sidelink communication, there is also a limit to processing in a communication apparatus, and, thus, it is desired to study the conditions on the processing time of the communication apparatus.

There is a need for optimizing the scheduling timing in consideration of requirements on processing in the communication apparatus.

Means for Solving the Problem

According to an aspect of the present invention, provided is a communication apparatus including a receiving unit configured to receive data on a sidelink shared channel; a control unit configured to generate acknowledgement information about the received data; and a transmitting unit configured to, upon detecting that a first elapsed time from receiving the data by the receiving unit until a timing for transmitting the acknowledgement information via a sidelink is shorter than a first reference time, defer the timing for transmitting the acknowledgement information via the sidelink until the first elapsed time becomes longer than or equal to the first reference time.

Advantage of the Invention

According to an embodiment, scheduling timing can be optimized in consideration of requirements on processing in a communication apparatus.

BRIEF DESCRIPTION OF DRAWINGS

FIG. 8B is a diagram illustrating an outline of SL transmission mode 2a.

EMBODIMENTS OF THE INVENTION

In the following, embodiments of the present invention are described with reference to the appended drawings. The embodiments described below are merely an example, and embodiments to which the present invention is applied are not limited to the following embodiments.

In the embodiments, it is assumed that a direct communication scheme between communication apparatuses is LTE sidelink (SL) or NR SL, but the direct communication method is not limited to this method. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signals (PSS/SSS/PSSS/SSSS) used for synchronization.

For example, in UL, a reference signal of an antenna port X is used as the reference signal to be referred to so as to determine the path loss in the transmission power control, and in SL (including UL used as SL), a reference signal of an antenna port Y is used as the reference signal to be referred to so as to determine the path loss in the transmission power control.

Furthermore, in the embodiments, a configuration in which a communication apparatus is installed in a vehicle is mainly assumed, but an embodiment of the present invention is not limited to this configuration. For example, a communication apparatus may be a terminal carried by a person, a communication apparatus may be a drone or a device installed in an aircraft, and a communication apparatus may be a base station, an RSU, a relay station (relay node), a user equipment provided with scheduling capability, or the like.

(Overview of Sidelink)

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in NR. A sidelink communication may be defined to be a direct communication performed among two or more neighboring units of user equipment by using E-UTRA technology, without going through a network node. A sidelink may be defined to be an interface between units of user equipment in a sidelink communication.

Figure 1:
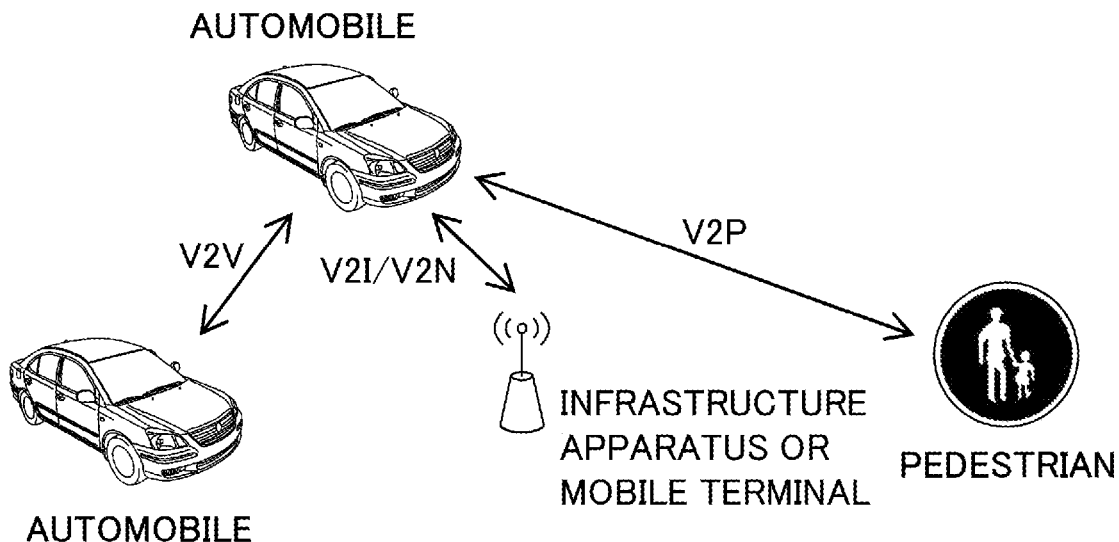
FIG. 1 is a diagram for illustrating V2X.
Figure 2A:
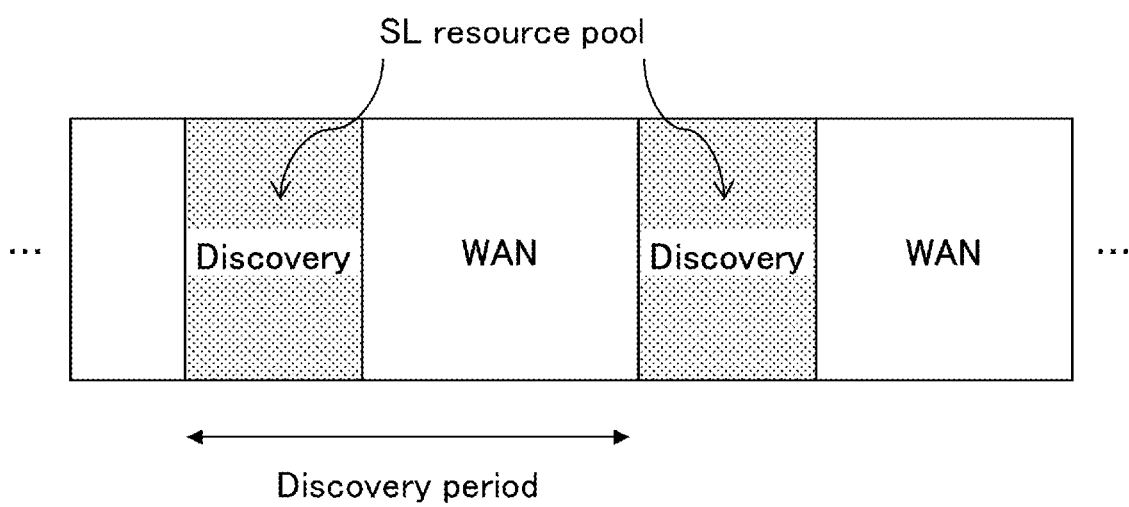
FIG. 2A is a diagram for illustrating sidelink.

Sidelink is roughly divided into "discovery" and "communication." For "discovery," as illustrated in FIG. 2A, a discovery message resource pool is configured for each discovery period, and a communication apparatus (referred to as a UE) transmits a discovery message (discovery signal) within the resource pool. More specifically, there are Type 1 and Type 2b. In Type 1, a communication apparatus autonomously selects a transmission resource from the resource pool. In Type 2b, a quasi-static resource is allocated by higher layer signaling (for example, an RRC signal).

Figure 2B:
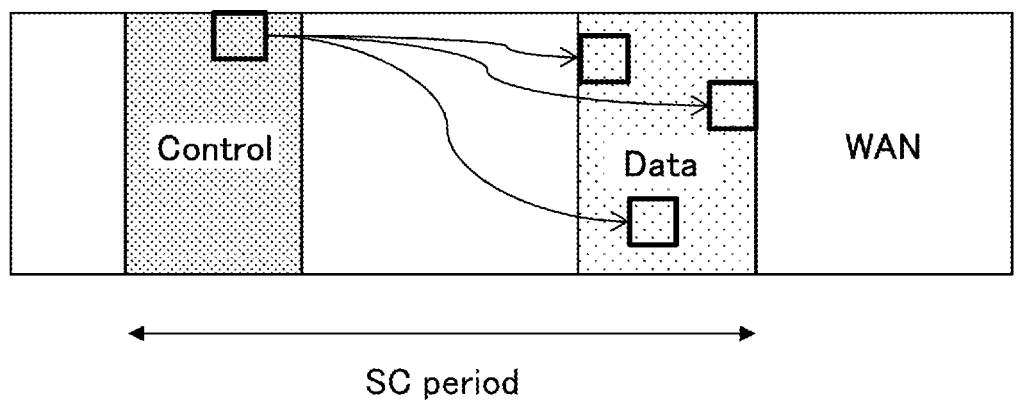
FIG. 2B is a diagram for illustrating sidelink.

For "communication," as illustrated in FIG. 2B, a sidelink control information (SCI)/data transmission resource pool is periodically configured for each Sidelink Control (SC) period. A communication apparatus on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a communication apparatus. In the mode 2, a communication apparatus autonomously selects a transmission resource from the resource pool. For example, the resource pool is provided by notification through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted.

Figure 3:
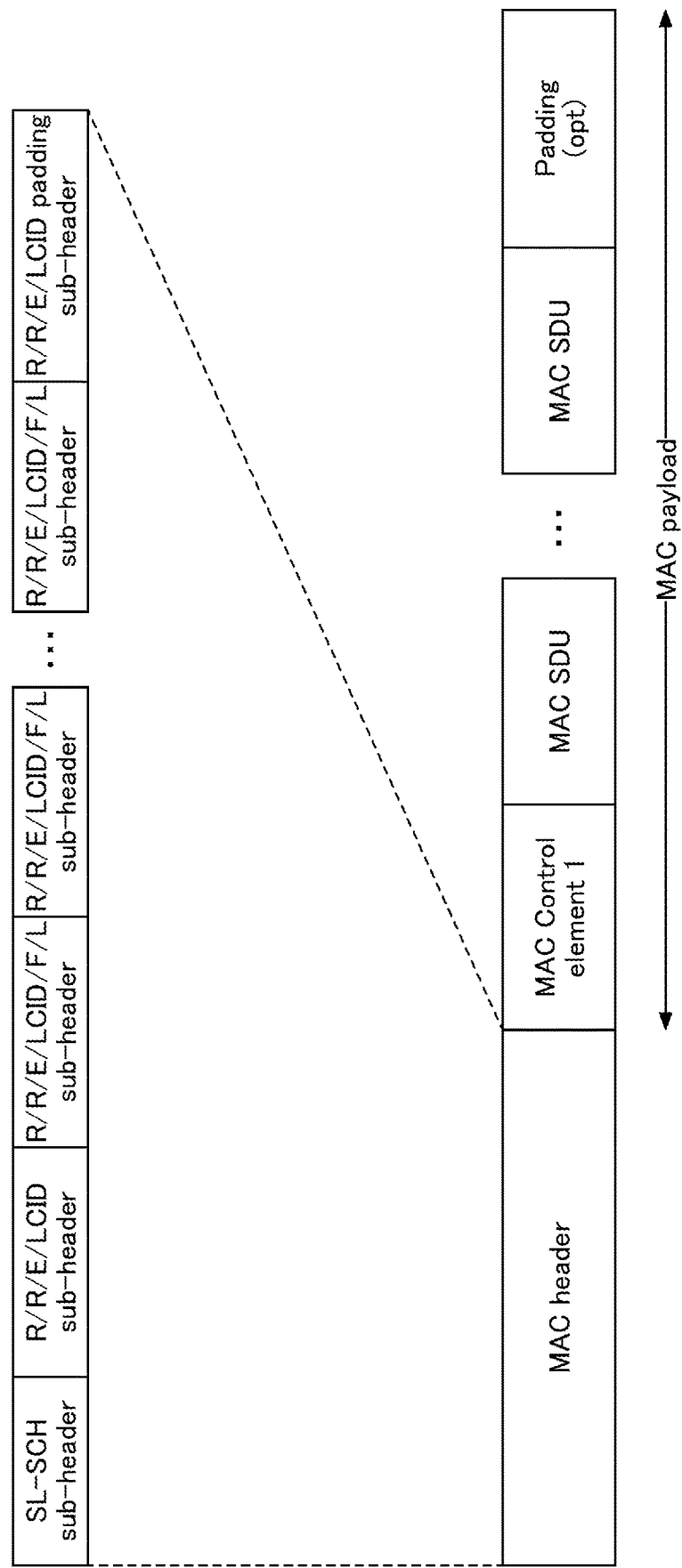
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
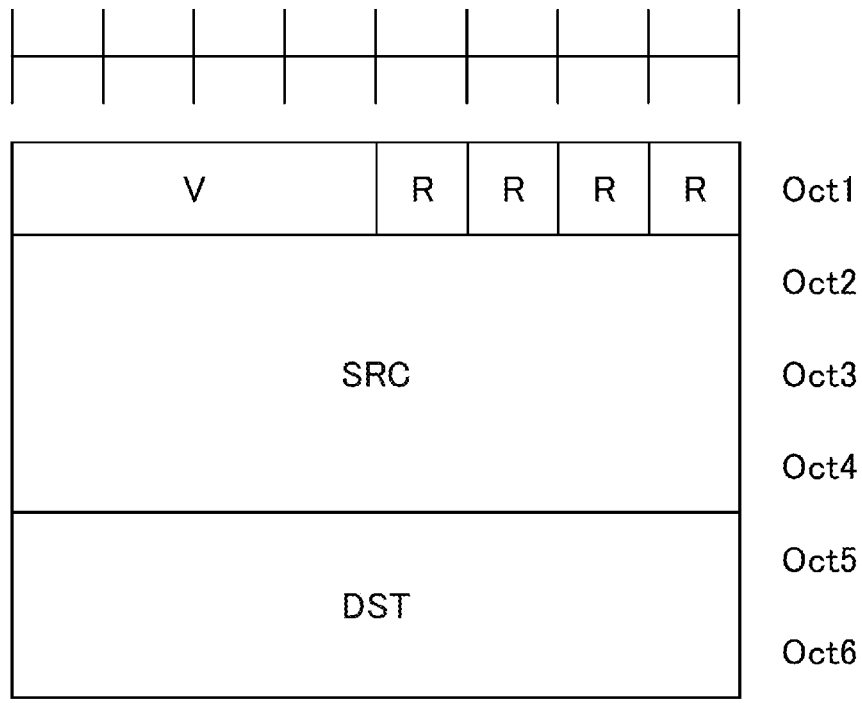
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the communication apparatus. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
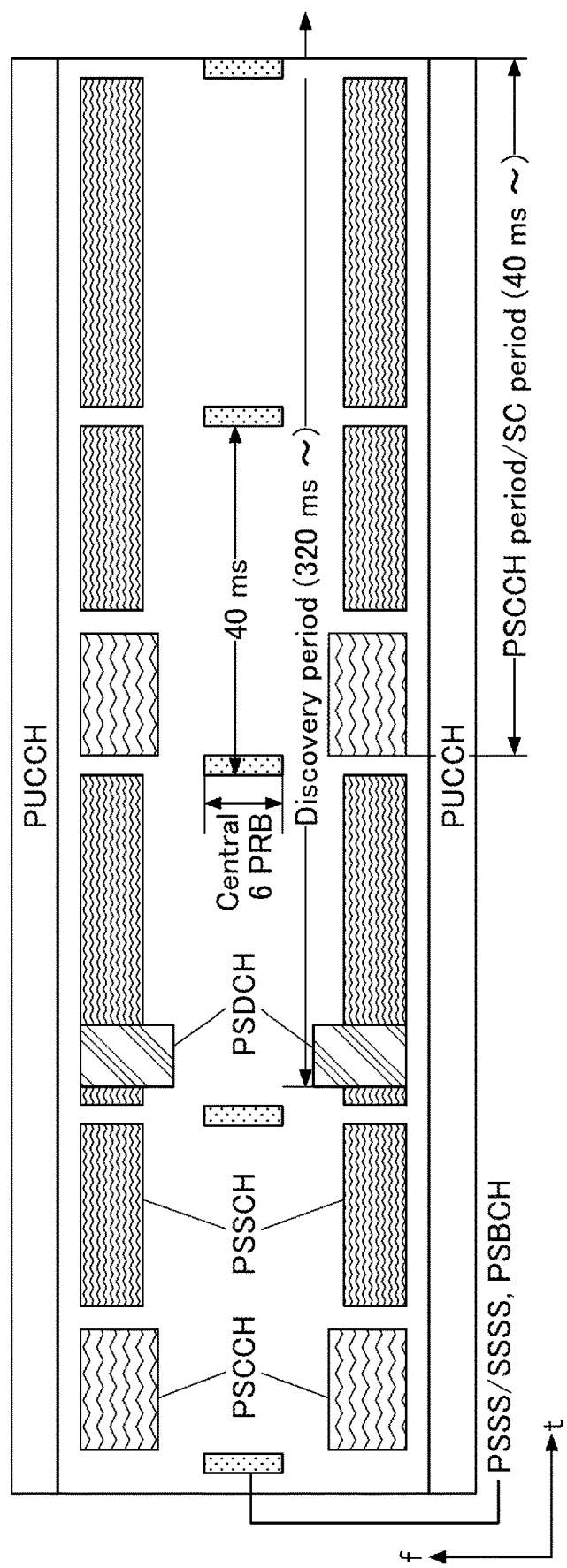
FIG. 5 is a diagram for illustrating an example of a channel structure used in LTE-V2X sidelink.

An example of a channel structure of LTE-V2X sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication." Note that the PSDCH need not be included for NR-V2X.

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a method related to "communication." However, in the embodiments, there may be no distinction between "communication" and "discovery." Furthermore, the technology according to the embodiments may be applied in "discovery."

(System Configuration)

Figure 6:
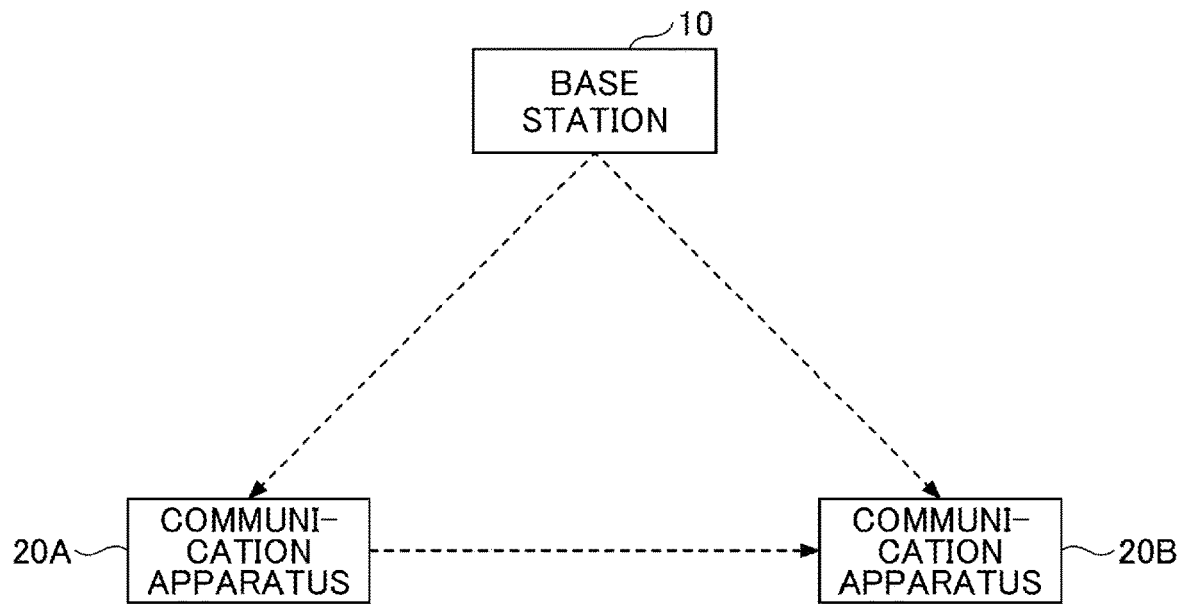
FIG. 6 is a diagram indicating an example of a configuration of a radio communication system according to an embodiment.

FIG. 6 is a diagram illustrating a configuration example of a radio communication system according to the embodiments. As illustrated in FIG. 6, the radio communication system according to the embodiments includes a base station 10, a communication apparatus 20A, and a communication apparatus 20B. Note that, actually, there may be many communication apparatuses, but FIG. 6 illustrates the communication apparatus 20A and the communication apparatus 20B as an example.

In FIG. 6, it is intended that the communication apparatus 20A is the transmission side, the communication apparatus 20B is the reception side, but both the communication apparatus 20A and the communication apparatus 20B have both the transmission function and the reception function. Hereinafter, when it is not necessary to particularly distinguish the communication apparatuses 20A and 20B, they are referred to simply as a "communication apparatus 20" or a "communication apparatus." FIG. 6 illustrates a case in which the communication apparatus 20A and the communication apparatus 20B are both in the coverage as an example, but an operation according to the embodiments can be applied to a case in which all the communication apparatuses 20 are within the coverage, a case in which some communication apparatuses 20 are within the coverage whereas the other communication apparatuses 20 are outside the coverage, and a case in which all the communication apparatuses 20 are outside the coverage.

In the embodiments, the communication apparatus 20 is a device installed in a vehicle such as, for example, an automobile and has a cellular communication function as a UE in LTE or NR and a sidelink function. Furthermore, the communication apparatus 20 has a function of acquiring report information (position, event information, or the like) as in a GPS device, a camera, or various types of sensors. Furthermore, the communication apparatus 20 may be a general mobile terminal (such as a smartphone). Furthermore, the communication apparatus 20 may be an RSU. The RSU may be a UE type RSU having a function of a UE, a BS type RSU (which is also referred to as a gNB type UE) having a function of a base station, or a relay station.

The communication apparatus 20 need not be a device of one housing, and for example, even when various types of sensors are distributed and arranged in a vehicle, a device including various types of sensors is the communication apparatus 20. Furthermore, the communication apparatus 20 may have a function of performing transmission and reception of data with various types of sensors without including various types of sensors.

Furthermore, processing of sidelink transmission of the communication apparatus 20 is basically the same as processing of UL transmission in LTE or NR. For example, the communication apparatus 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the communication apparatus 20 in the embodiments. Furthermore, the base station 10 may be an RSU (a gNB type RSU), a relay station, or a communication apparatus provided with a scheduling function.

Furthermore, in the radio communication system according to the embodiments, a signal waveform used for SL or UL by the communication apparatus 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the communication apparatus 20 can operate in any mode among a mode 1 which is a mode in which resources are dynamically allocated by the ((enhanced) physical downlink control channel ((E) PDCCH) transmitted from the base station 10 to the communication apparatus, a mode 2 which is a mode in which the communication apparatus autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the communication apparatus 20 from the base station 10.

Figure 7:
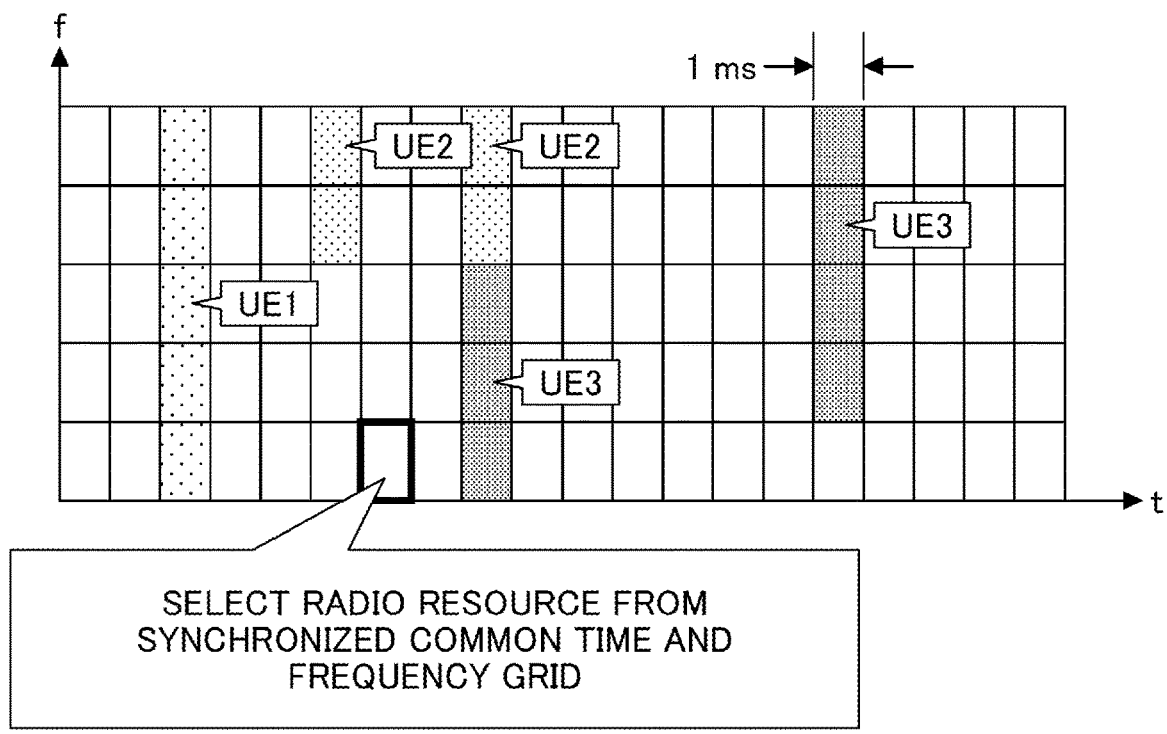
FIG. 7 is a diagram for illustrating a resource selection operation of a communication apparatus.

As illustrated in FIG. 7, the communication apparatus of the mode 4 (indicated by a UE in FIG. 7) selects a radio resource from a synchronized common time/frequency grid. For example, the communication apparatus 20 performs sensing in the background, specifies resources which have a good sensing result and are not reserved for other communication apparatuses as candidate resources, and selects a resource to be used for transmission from the candidate resources.

(Overview of NR V2X)

In NR V2X, transmission modes are specified that are the same as SL transmission mode 3 and SL transmission mode 4 that are specified in LTE V2X.

In the following, an outline of transmission modes defined by NR V2X is described with reference to FIG. 8A to FIG. 8D.

Figure 8A:
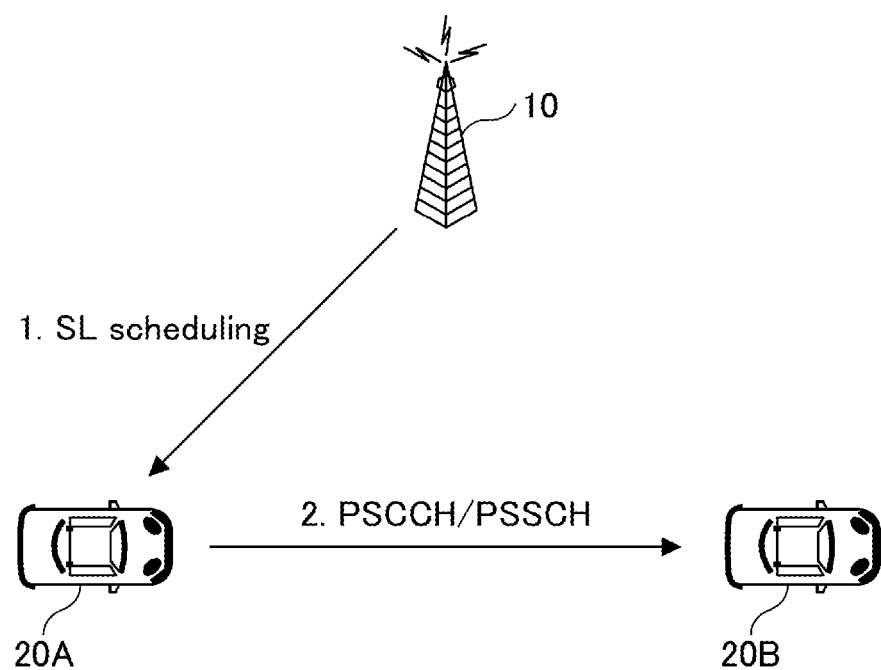
FIG. 8A is a diagram illustrating an outline of SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and assigns the transmission resource to the transmitting communication apparatus 20A. The communication apparatus 20A transmits a signal to the receiving communication apparatus 20B by using the assigned transmission resource.

Figure 8B:
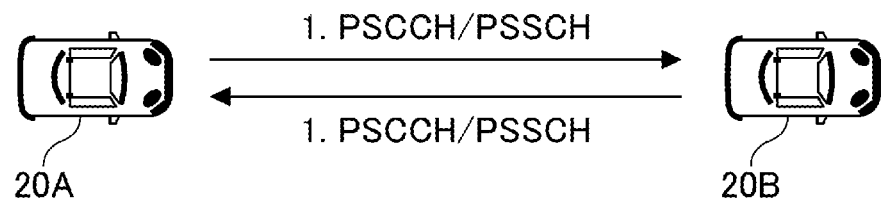
Figure 8C:
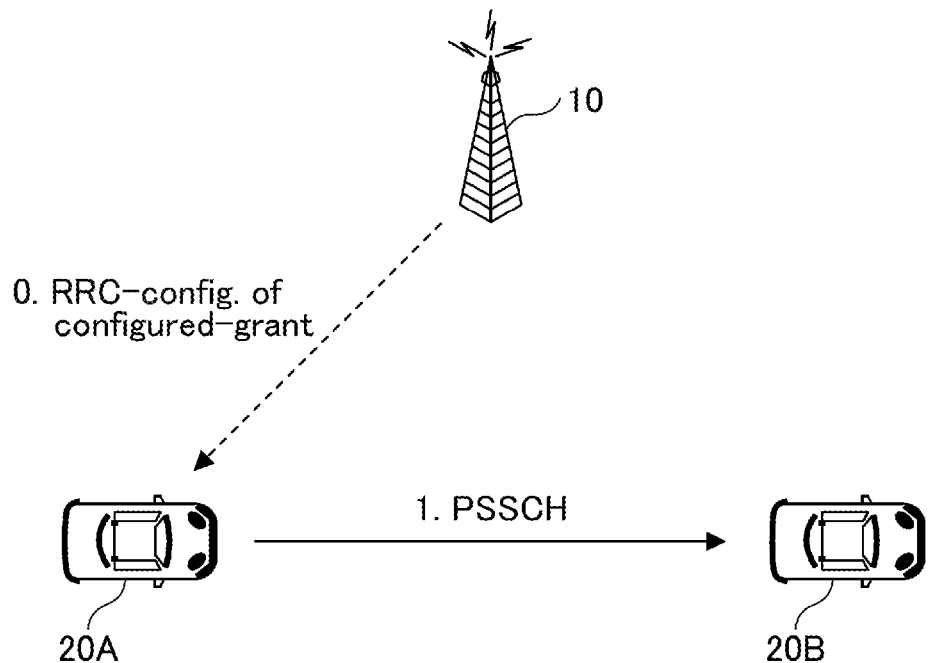
FIG. 8C is a diagram illustrating an outline of SL transmission mode 2c.
Figure 8D:
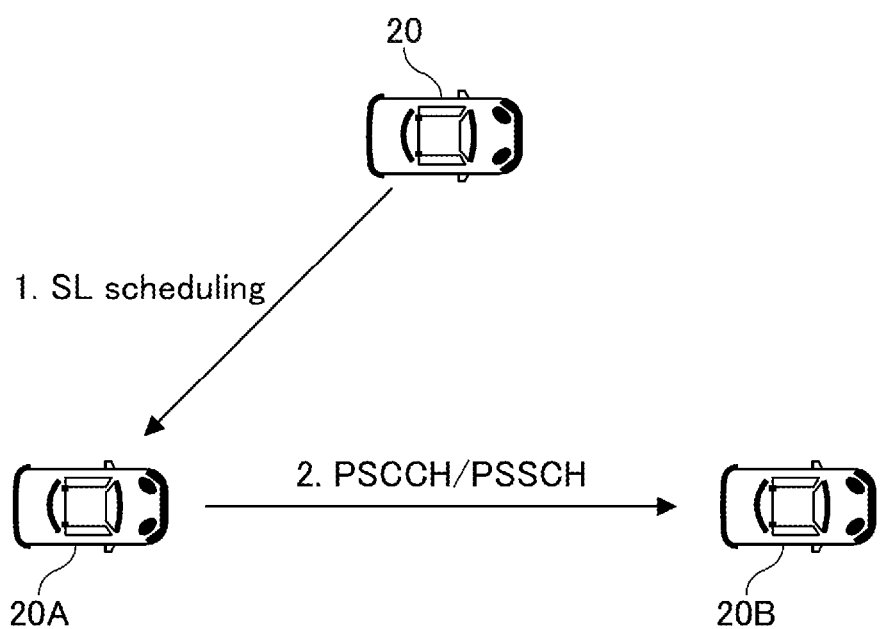
FIG. 8D is a diagram illustrating an outline of SL transmission mode 2d.

FIG. 8B, FIG. 8C, and FIG. 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting communication apparatus 20A autonomously selects a transmission resource and transmits a signal to the receiving communication apparatus 20B by using the selected transmission resource.

FIG. 8C is a diagram illustrating an outline of SL transmission mode 2c. In the SL transmission mode 2c, for example, the base station 10 preconfigures transmitting resources with a certain period to the communication apparatus 20A, and the communication apparatus 20A transmits a signal to the receiving communication apparatus 20B by using the transmitting resources with the predetermined period. Here, instead of the base station 10 preconfiguring the transmitting resources with the certain period to the communication apparatus 20A, for example, the transmitting resources with the certain period may be configured to the communication apparatus 20A according to a specification.

FIG. 8D is a diagram illustrating an overview of SL transmission mode 2d. In SL transmission mode 2d, for example, the communication apparatus 20 performs an operation that is the same as an operation of the base station 10. Specifically, the communication apparatus 20 schedules transmission resources and assigns the transmission resources to the transmitting communication apparatus 20A. The communication apparatus 20A may perform a transmission to a receiving communication apparatus 20B by using the assigned communication resources. Namely, the communication apparatus 20 may control a transmission by another communication apparatus 20.

Figure 9A:
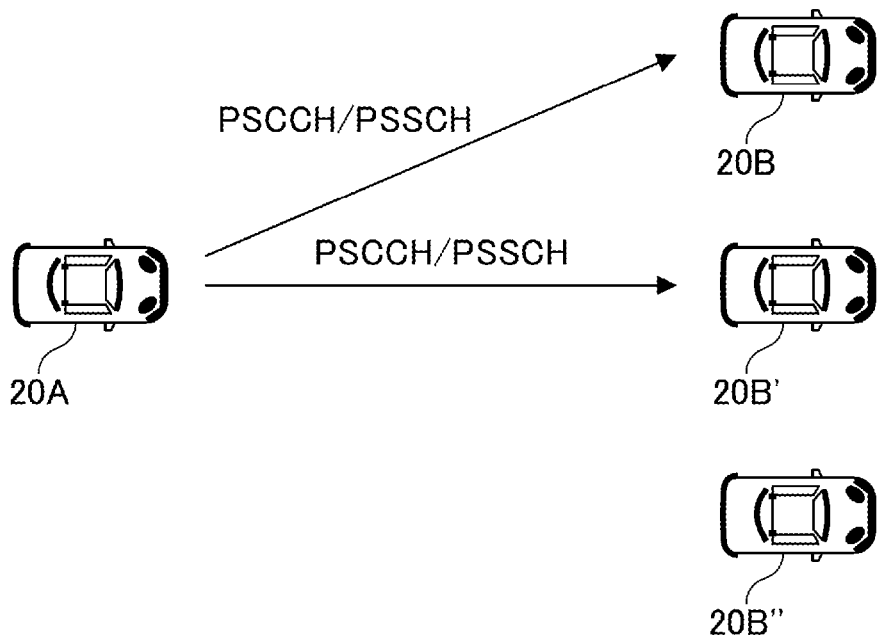
FIG. 9A is a diagram illustrating an example of a unicast PSCCH/PSSCH transmission.
Figure 9B:
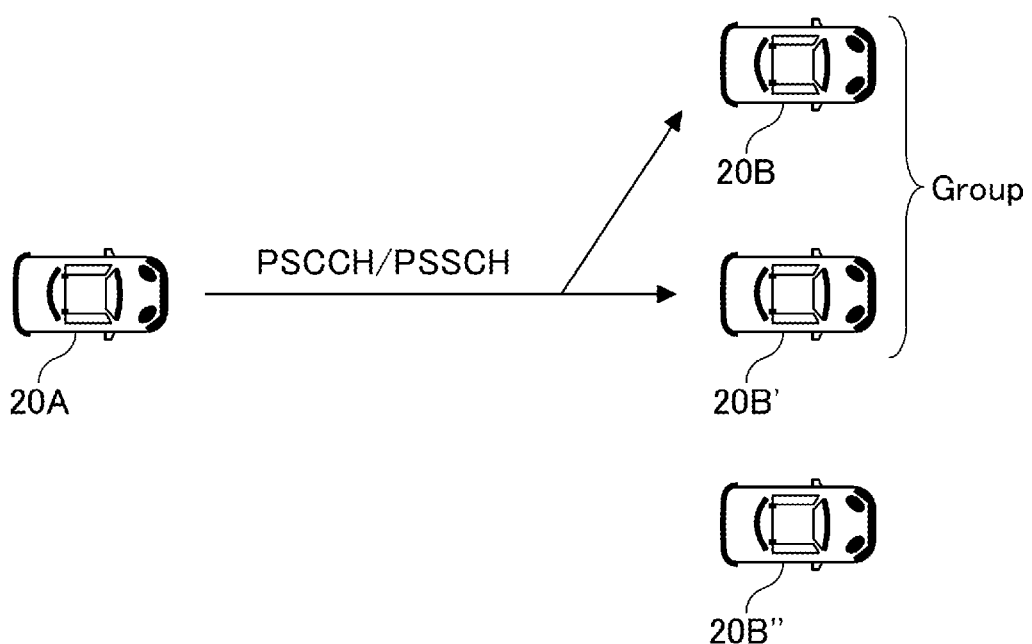
FIG. 9B is a diagram illustrating an example of a groupcast PSCCH/PSSCH transmission.
Figure 9C:
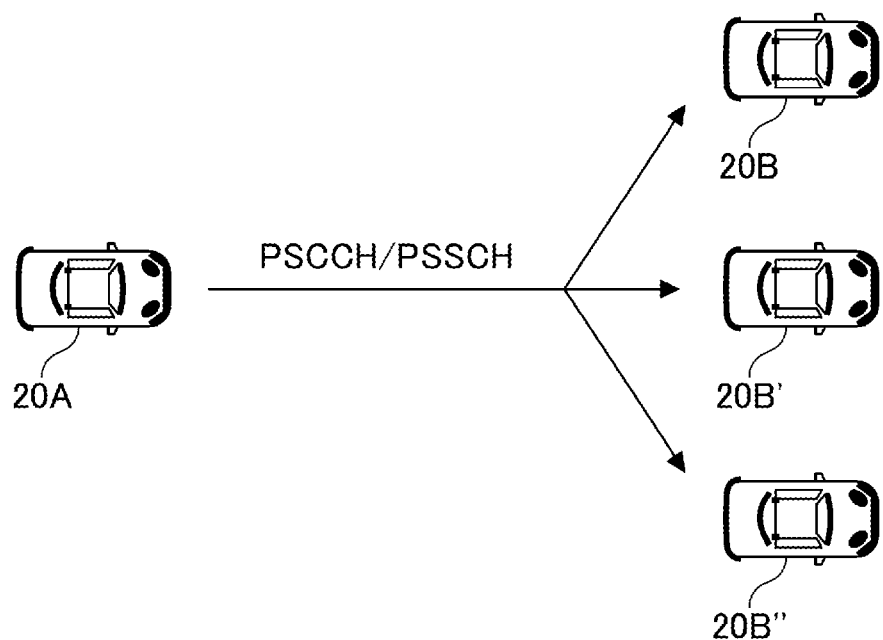
FIG. 9C is a diagram illustrating an example of a broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting communication apparatus 20A to the receiving communication apparatus 20B.

FIG. 9B is a diagram illustrating an example of group cast PSCCH/PSSCH transmission. A group cast, for example, refers to a transmission from the transmitting communication apparatus 20A to the communication apparatus 20B and a receiving communication apparatus 20B', which are a group of the receiving communication apparatuses 20.

FIG. 9C is a diagram illustrating an example of a broadcast PSCCH/PSSCH transmission. Broadcast refers, for example, to a transmission from the transmitting communication apparatus 20A to the communication apparatus 20B, the communication apparatus 20B', and a communication apparatus 20B" which are all the receiving communication apparatuses 20 within a predetermined range.

As compared to the Long Term Evolution (LTE) system, the New Radio (NR) system enables more flexible resource allocation.

In a case where the communication apparatus 20 (UE: User Equipment) transmits and receives data, the communication apparatus 20 internally requires a time for executing processing for transmitting and receiving data. For this reason, even if flexible resource allocation is possible, it is desired to secure a time to execute processing for data transmission and reception in the communication apparatus 20. Accordingly, for example, when a resource is assigned and data is transmitted immediately after the assignment, the timing of data transmission is restricted by the above-described time for executing processing for data transmission and reception in the communication apparatus 20.

For example, in a case where the communication apparatus 20 receives, in a duration from the first symbol to the third symbol in a slot n, a signal of Physical Downlink Control Channel (PDCCH) including control information instructing transmission of data on Physical Uplink Shared Channel (PUSCH) in the 13-th symbol and the 14-th symbol in the slot n, the communication apparatus 20 can secure a time for only about 10 symbols as the time for preparing for transmission of data. Accordingly, the communication apparatus 20 may not be able to complete preparation for transmitting data. For example, as a preparation for transmitting data, it is required to perform decoding processing performed when a signal is received on PDCCH, encoding processing of data to be transmitted in PUSCH, transmission power control, and the like.

Here, the following three parameters are defined as a preparation time related to transmission by the communication apparatus 20 with regard to NR-Uu (an interface between the communication apparatus 20 and the base station 10).

(1) PDSCH Processing Procedure Time ($T_{proc,\,1}$)

$T_{proc,\,1}$ defines a time between the last symbol in the time direction of PDSCH and the first symbol in the time direction of Physical Uplink Control Channel (PUCCH) transmitting Hybrid Automatic Repeat Request (HARQ)-Acknowledgement (ACK) corresponding to the PDSCH.

(2) PUSCH Preparation Procedure Time ($T_{proc,\,2}$)

$T_{proc,\,2}$ defines a time between a last symbol in the time direction of PDCCH and a first symbol in the time direction of PUSCH scheduled by the PDCCH.

(3) Channel State Information (CSI) Computation Time ($T_{proc,\,CSI}$ and $T'_{proc,\,CSI}$)

$T_{proc,\,CSI}$ defines a time between the last symbol in the time direction of PDCCH and the first symbol in the time direction of PUSCH for transmitting CSI triggered by the PDCCH.

$T'_{proc,\,CSI}$ defines a time between the last symbol in the time direction of CSI Reference Signal (CSI-RS)/CSI Interference Measurement resource (CSI-IM) and the first symbol in the time direction of PUSCH for transmitting CSI measured by the CSI-RS/IM.

It should be noted that the details of $T_{proc,\,1}$, $T_{proc,\,2}$, $T_{proc,\,CSI}$, $T'_{proc,\,CSI}$ are described in Non-Patent Document 1.

Problems

As described above, with regard to NR-Uu, the processing time in the communication apparatus 20 is defined. In NR sidelink communication, there is also a limitation in the processing performed by the communication apparatus 20, and thus, the conditions for the processing time of the communication apparatus 20 are to be studied.

With regard to sidelink communication of NR, for example, it is proposed to define the processing time of the communication apparatus 20 for the following items.

(Item 1)

Physical Sidelink Shared Channel (PSSCH) processing procedure time for HARQ-ACK feedback on Physical Sidelink Feedback Channel (PSFCH): a time between the last symbol in the time direction of PSSCH and the first symbol in the time direction of PSFCH for transmitting the corresponding HARQ-ACK is to be defined.

(Item 2)

PSSCH processing procedure time for HARQ-ACK feedback on PUCCH/PUSCH: in a mode 1, i.e., in a case where the base station 10 (gNodeB) assigns a resource for sidelink transmission to the communication apparatus 20, and the receiving communication apparatus 20 directly transmits a HARQ-ACK/Scheduling Request (SR) to the base station 10, a time between the last symbol in the time direction of PSSCH and the first symbol in the time direction of PUCCH/PUSCH for transmitting the corresponding HARQ-ACK/SR is to be defined.

(Item 3) PSFCH processing time for HARQ-ACK feedback on PUCCH/PUSCH: in a case where the mode 1 is used, and the receiving communication apparatus 20 transmits HARQ-ACK feedback to the transmitting communication apparatus 20, and the transmitting communication apparatus 20 transmits HARQ-ACK/SR feedback to the base station 10, or transmits a feedback signal similar to HARQ-ACK feedback to the base station 10, a time between the last symbol in the time direction of PSFCH and the first symbol in the time direction of PUCCH/PUSCH for transmitting the corresponding HARQ-ACK/SR is to be defined.

(Item 4)

PSSCH preparation procedure time for Resource Allocation (RA) mode 1: a time between the last symbol in the time direction of PDCCH and the first symbol in the time direction of PSSCH scheduled by the PDCCH is to be defined.

(Item 5)

PSSCH preparation procedure time for RA mode-d: in a case where a communication apparatus 20 controls sidelink transmission of another communication apparatus 20, a time between the last symbol in the time direction of Physical Sidelink Control Channel (PSCCH) and the first symbol in the time direction of PSSCH scheduled by the PSCCH is to be defined.

(Item 6)

CSI computation time: a time between the last symbol in the time direction of PSCCH and the first symbol in the time direction of PSSCH for transmitting CSI triggered by the PSCCH is to be defined. Alternatively, a time between the last symbol in the time direction of CSI-RS/IM and the first symbol in the time direction of PSSCH for transmitting CSI measured by the CSI-RS/IM is to be defined.

(Item 7)

Priority sharing procedure time between Radio Access Technologies (RATs): for example, in a case where, in the communication apparatus 20, timing for LTE sidelink transmission matches timing for NR sidelink transmission, transmission of sidelink in LTE and transmission of sidelink in NR are not to be performed at the same time. Instead, it is assumed to compare, with regard to an LTE sidelink module and an NR sidelink module, a priority associated with a packet transmitted via LTE sidelink and another priority associated with a packet transmitted via NR sidelink are compared, and to transmit only a packet of a higher priority. A time for exchanging such information between the LTE sidelink module and the NR sidelink module is to be defined.

Currently, the 3GPP working group is studying a possibility that an LTE sidelink transmission and an NR sidelink transmission are performed simultaneously in the communication apparatus 20. It is assumed that, if the priority of transmission of a packet via the LTE sidelink and the priority of transmission of a packet via the NR sidelink are known prior to a transmission with a processing time in the communication apparatus 20, the communication apparatus 20 transmits a packet of a higher priority. In this case, if the priority of transmission of sidelink in LTE and the priority of transmission of sidelink in NR are the same, it is assumed that which transmission is selected depends on the implementation of the communication apparatus 20. If the priority of transmission of a packet via the LTE sidelink and the priority of transmission of a packet via the NR sidelink are not known prior to a transmission with a processing time in the communication apparatus 20, the processing of the transmission via the LTE sidelink and the transmission of the NR sidelink is assumed to depend on the implementation of the communication apparatus (for example, transmission of LTE may always be prioritized).

(Proposal for Item 1)

Figure 10:
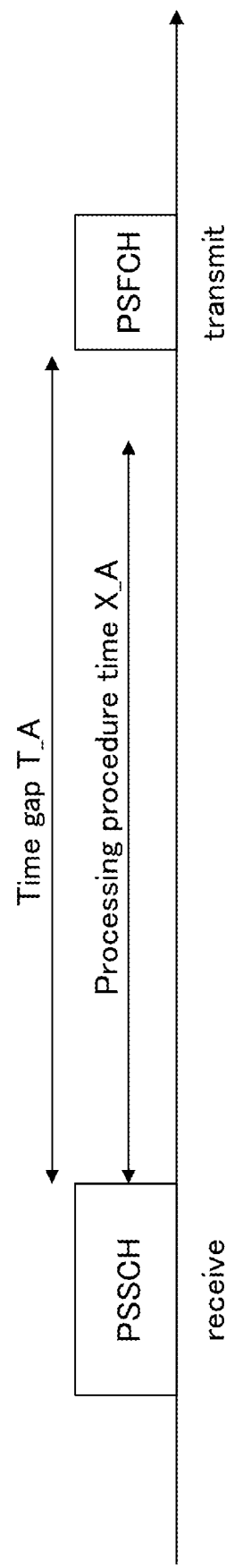
FIG. 10 is a diagram illustrating an example in which a processing time for a communication apparatus, after receiving data via PSSCH, to transmit HARQ-ACK via PSFCH is X_A.

In a case where the communication apparatus 20 receives data via PSSCH, and the communication apparatus 20 transmits a control signal including HARQ-ACK corresponding to the PSSCH via a PSFCH, as illustrated in FIG. 10, a processing time for the communication apparatus 20, after receiving data via the PSSCH, to transmit HARQ-ACK via the PSFCH is set to X_A symbols, slots, sub-slots, milliseconds, or the like.

(A-1) The receiving communication apparatus 20 need not assume that transmission of PSFCH including HARQ-ACK corresponding to the PSSCH is (pre)configured or scheduled in a time interval (time gap T_A) shorter than X_A after receiving data via the PSSCH. More specifically, if the receiving communication apparatus 20, after receiving data via PSSCH, transmits HARQ-ACK corresponding to the PSSCH via PSFCH, the time gap T_A between the PSSCH and the PSFCH is to be equal longer than or equal to the processing time X_A. Furthermore, if the transmitting communication apparatus 20, after transmitting data via PSSCH, receives HARQ-ACK corresponding to the PSSCH via PSFCH, the time gap T_A between the PSSCH and the PSFCH is to be longer than or equal to the processing time X_A.

(A-2) The receiving communication apparatus 20 may defer transmission of PSFCH including HARQ-ACK corresponding to the PSSCH until the elapsed time from reception of data via PSSCH becomes longer than or equal to X_A. In this case, units of deferring PSFCH transmission may be slots, symbols, sub-slots, milliseconds, or the like. Furthermore, the transmitting communication apparatus 20 may assume that, after transmission of data via PSSCH, reception of PSFCH including HARQ-ACK corresponding to the PSSCH is at a point in time at which the elapsed time becomes longer than or equal to X_A.

(A-3) The receiving communication apparatus 20 need not perform transmission of PSFCH including HARQ-ACK corresponding to the PSSCH in a time gap (T_A) shorter than X_A after receiving data via PSSCH. The transmitting communication apparatus 20 may assume that, after transmitting data via PSSCH, the transmitting communication apparatus 20 does not receive PSFCH including HARQ-ACK corresponding to the PSSCH in the time gap shorter than X_A.

(A-4) The above X_A may be the same as PDSCH processing procedure time (A-4-1). In this case, the implementation of the communication apparatus 20 becomes easy. Alternatively, the above X_A may be larger or smaller than PDSCH processing procedure time (A-4-2). In this case, for example, additional timing offset from the PDSCH processing procedure time may be defined/(pre)configured. (A-4-3) Additionally, the above X_A may be defined by a technical specification document, or may be (pre)configured.

(Proposal on Item 2)

Figure 11:
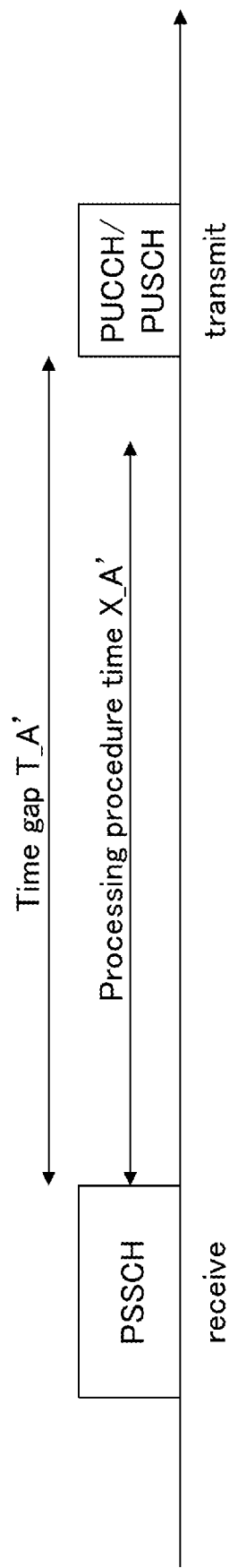
FIG. 11 is a diagram illustrating an example in which a processing time for a communication apparatus, after receiving data via PSSCH, to transmit HARQ-ACK via PUCCH transmission or PUSCH is X_A'.

In a case where the communication apparatus 20 receives data via PSSCH and performs transmission of PUCCH or transmission of PUSCH including HARQ-ACK/SR corresponding to the PSSCH, as illustrated in FIG. 11, a processing time for the communication apparatus 20, after receiving data via PSSCH, to transmit HARQ-ACK/SR corresponding to the PSSCH via PUCCH transmission or PUSCH is assumed to be X_A' symbols, slots, sub-slots, milliseconds, or the like.

(A'-1) The receiving communication apparatus 20, after receiving data via PSSCH, need not assume that transmission of PUCCH or transmission of PUSCH including HARQ-ACK/SR corresponding to the PSSCH is (pre)configured or scheduled in a time gap (T_A') shorter than X_A'. Namely, if the communication apparatus 20 transmits HARQ-ACK/SR corresponding to the PSSCH via PUCCH or PUSCH after reception of data via PSSCH, the time gap T_A' between the PSSCH and the PUCCH or the PUSCH is to be longer than or equal to the processing time X_A'. Furthermore, if the transmitting communication apparatus 20 receives HARQ-ACK/SR corresponding to the PSSCH via the PUCCH or the PUSCH after transmitting data via PSSCH, the time gap T_A' between the PSSCH and the PUCCH or the PUSCH is to be longer than or equal to the processing time X_A'.

(A'-2) The receiving communication apparatus 20 may defer transmission of PUCCH or transmission of PUSCH including HARQ-ACK/SR corresponding to the PSSCH until the elapsed time from reception of data via PSSCH becomes longer than or equal to X_A'. In this case, units of deferring PUCCH transmission or PUSCH transmission may be slots, symbols, sub-slots, milliseconds, or the like. Furthermore, the transmitting communication apparatus 20, after transmitting data via PSSCH, may assume that transmission of PUCCH or reception of PUSCH including HARQ-ACK corresponding to the PSSCH is at a point in time at which the elapsed time becomes longer than or equal to X_A.

(A'-3) The receiving communication apparatus 20, after receiving data via PSSCH, need not perform transmission of PUCCH or transmission of PUSCH including HARQ-ACK/SR corresponding to the PSSCH in a time gap (T_A') shorter than X_A'. The transmitting communication apparatus 20 may assume that, after transmitting data via PSSCH, PUCCH transmission or PUSCH reception including HARQ-ACK corresponding to the PSSCH is not performed in the time gap shorter than X_A'.

(A'-4) The above X_A' may be the same as PDSCH processing procedure time (A'-4-1). In this case, the implementation of the communication apparatus 20 becomes easy. Alternatively, the above X_A' may be larger or smaller than PDSCH processing procedure time (A'-4-2). In this case, for example, additional timing offset from the PDSCH processing procedure time may be defined/(pre)configured. (A'-4-3) Additionally, the above X_A' may be defined by a specification, or may be (pre)configured. (A'-4-4) X_A' may be the same as the above X_A.

(Proposal on Item 3)

Figure 12:
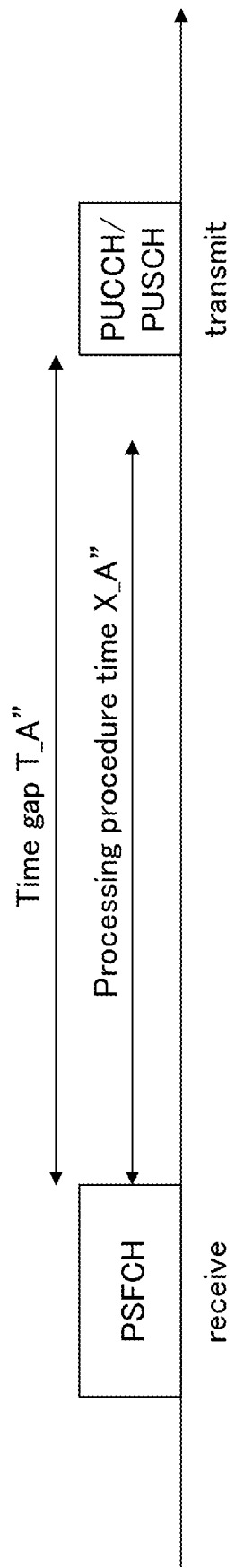
FIG. 12 is a diagram illustrating an example in which a time for a communication apparatus, after receiving data via PSFCH, to configure/schedule a PUCCH/PUSCH resource is X_A".

It is assumed that the receiving communication apparatus 20 transmits HARQ-ACK feedback to the transmitting communication apparatus 20 using PSFCH, and the transmitting communication apparatus 20 transmits, to the base station 10, HARQ-ACK/SR feedback using PUCCH/PUSCH, or transmits SR/Buffer Status Report (BSR) for retransmission of a transport block (TB) corresponding to the PSFCH using PUCCH/PUSCH. With regard to the above reception of PSFCH and the transmission of PUCCH/PUSCH, as illustrated in FIG. 12, a processing time for the communication apparatus 20, after receiving data (HARQ-ACK) via PSFCH, to transmit the PUCCH/PUSCH is assumed to be X_A" symbol, slot, sub-slot, millisecond, or the like.

(A"-1) The communication apparatus 20 need not assume that transmission of PUCCH/PUSCH corresponding to the PSFCH is (pre)configured or scheduled in a time gap (T_A') shorter than X_A" after receiving HARQ-ACK via PSFCH. Namely, if the communication apparatus 20 receives HARQ-ACK via PSFCH and thereafter transmits at least one of HARQ-ACK/SR/BSR corresponding to the above PSFCH via PUCCH or PUSCH, the time gap T_A" between the PSFCH and the PUCCH or the PUSCH is to be longer than or equal to the processing time X_A".

(A"-2) The communication apparatus 20 may defer transmission of PUCCH/PUSCH corresponding to the PSFCH until the elapsed time from reception of HARQ-ACK via PSFCH becomes longer than or equal to X_A". In this case, units of deferring PUCCH/PUSCH transmission may be slots, symbols, sub-slots, milliseconds, or the like.

(A"-3) The communication apparatus 20 need not perform, after receiving HARQ-ACK via PSFCH, transmission of PUCCH/PUSCH corresponding to the PSFCH in a time gap (T_A") shorter than X_A".

(A"-4) The above X_A" may be defined by (A"-4-1) a technical specification document, or may be (pre) configured.

(Proposal on Item 4)

Figure 13:
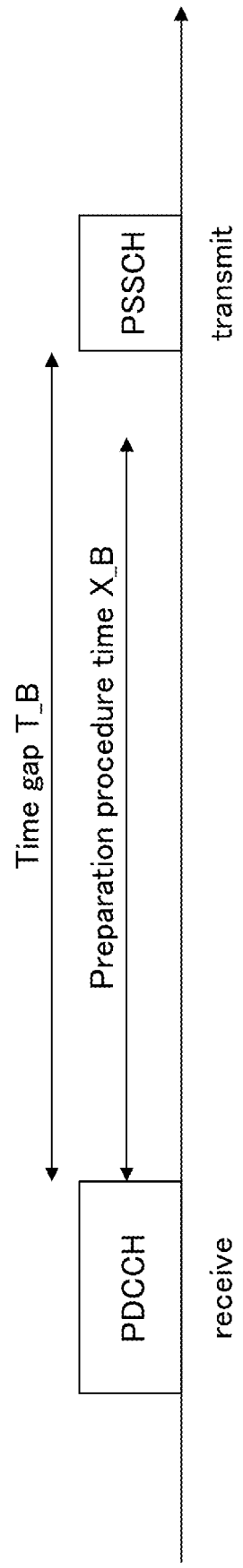
FIG. 13 is a diagram illustrating an example in which a time for a transmitting communication apparatus, after receiving a signal of PDCCH, to transmit, to a receiving communication apparatus, data via PSSCH is X_B.

In a case where the transmitting communication apparatus 20 receives PDCCH for scheduling transmission of PSSCH and thereafter the transmitting communication apparatus 20 transmits the PSSCH to the receiving communication apparatus 20, as illustrated in FIG. 13, a time for the transmitting communication apparatus 20, after the transmitting communication apparatus 20 receives a signal of the PDCCH, to transmit data via the PSSCH to the receiving communication apparatus 20 is assumed to be X_B symbol, slot, sub-slot, millisecond, or the like.

(B-1) If transmission of PSSCH is scheduled via PDCCH, the communication apparatus 20 need not assume that the PSSCH is scheduled in a time gap T_B shorter than X_B from the PDCCH. Namely, if the communication apparatus 20 is to transmit PSSCH after receiving a grant of the PSSCH via PDCCH, the time gap T_B between the PDCCH and the PSSCH is to be longer than or equal to the processing time X_B.

(B-2) The communication apparatus 20 may defer transmission of data on PSSCH scheduled by the PDCCH until the elapsed time from reception of the signal via the PDCCH becomes longer than or equal to X_B. In this case, units of deferring data transmission on PSSCH may be slots, symbols, sub-slots, milliseconds, or the like.

(B-3) The communication apparatus 20 need not perform, after receiving a signal via PDCCH, transmission of data on PSSCH scheduled by the PDCCH in a time gap (T_B) shorter than X_B.

(B-4) The above X_B may be the same as PUSCH preparation procedure time (B-4-1). In this case, the implementation of the communication apparatus 20 becomes easy. Alternatively, the above X_B may be larger or smaller than PUSCH preparation procedure time (B-4-2). In this case, for example, additional timing offset from the PUSCH preparation procedure time may be defined/(pre)configured. (B-4-3) Additionally, the above X_B may be defined by a technical specification document, or may be (pre) configured.

(Proposal on Item 5)

Figure 14:
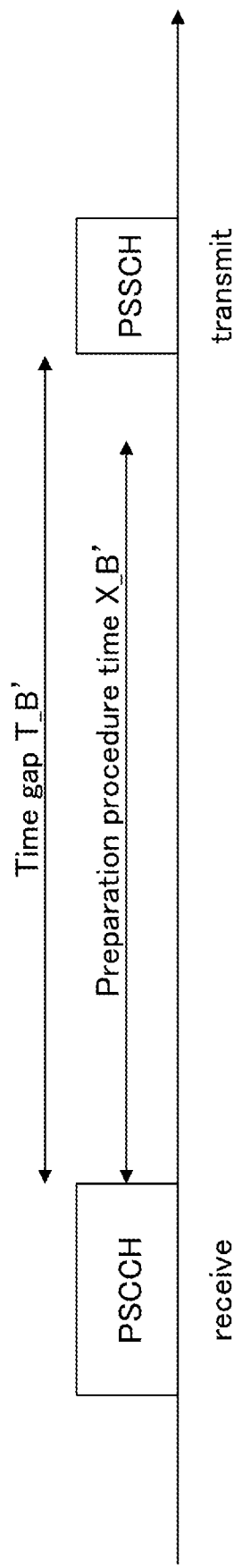
FIG. 14 is a diagram illustrating an example in which a time for a transmitting communication apparatus, after receiving a signal of PSCCH, to transmit, to a receiving communication apparatus, data via PSSCH is X_B'.

In a case where the transmitting communication apparatus 20 receives PSCCH for scheduling transmission of PSSCH and thereafter the transmitting communication apparatus 20 performs the above transmission of PSSCH to the receiving communication apparatus 20, as illustrated in FIG. 14, a time for the transmitting communication apparatus 20, after the transmitting communication apparatus 20 receives a signal of the PDCCH, to transmit data on the PSSCH to the receiving communication apparatus 20 is assumed to be X_B' symbol, slot, sub-slot, millisecond, or the like.

(B'-1) If transmission of PSSCH is scheduled via PSCCH, the transmitting communication apparatus 20 need not assume that the PSSCH is scheduled in a time gap (T_B') shorter than X_B' from the PSCCH. Namely, if the transmitting communication apparatus 20 performs the transmission of PSSCH after receiving a grant of PSSCH via PSCCH, the time gap T_B' between the PSCCH and the PSSCH is to be longer than or equal to the processing time X_B'. If a scheduling communication apparatus 20 is to transmit a grant of PSSCH via PSCCH, a time gap T_B' between the PSCCH and the PSSCH is to be longer than or equal to the processing time X_B'.

(B'-2) The transmitting communication apparatus 20, after receiving a signal via PSCCH, may defer transmission of data on PSSCH scheduled by the PSCCH until the elapsed time becomes longer than or equal to X_B'. In this case, units of deferring data transmission on PSSCH may be slots, symbols, sub-slots, milliseconds, or the like. The scheduling communication apparatus 20, after transmitting a signal via PSCCH, may assume that PSSCH scheduled by the PSCCH is transmitted by the transmitting communication apparatus 20 at a time point at which an elapsed time from the transmission of the signal via the PSCCH becomes longer than or equal to X_B'.

(B'-3) The transmitting communication apparatus 20 need not perform, after receiving a signal via PSCCH, transmission of data on PSSCH scheduled by the PSCCH in a time gap (T_B') shorter than X_B'. The scheduling communication apparatus 20 may assume that, after receiving a signal via PSCCH, PSSCH scheduled by the PSCCH is not transmitted by the transmitting communication apparatus 20 in the time gap shorter than X_B'.

(B'-4) The above X_B' may be the same as PUSCH preparation procedure time (B'-4-1). In this case, the implementation of the communication apparatus 20 becomes easy. Alternatively, the above X_B may be larger or smaller than PUSCH preparation procedure time (B'-4-2). In this case, for example, additional timing offset from the PUSCH preparation procedure time may be defined/(pre)configured. (B'-4-3) Additionally, the above X_B' may be defined by a technical specification document, or may be (pre)configured. (B'-4-4) X_B' may be the same as the above X_B.

(Proposal on Item 6)

Figure 15:
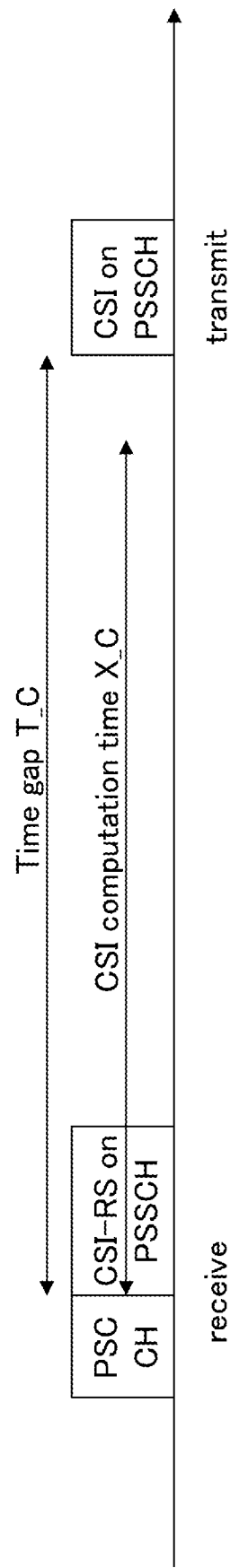
FIG. 15 is a diagram illustrating an example in which a time for a communication apparatus, after receiving a signal via PSCCH, to transmit data on PSSCH/PSFCH for reporting CSI is X_C.

In a case where the communication apparatus 20 receives PDCCH/PSCCH triggering a CSI report and transmits PSSCH/PSFCH/PUCCH/PUSCH for reporting the CSI, as illustrated in FIG. 15, a processing time for the communication apparatus 20, after the communication apparatus 20 receives a signal of the PDCCH/PSCCH, to transmit data on PSSCH/PSFCH/PUCCH/PUSCH for reporting the above CSI is assumed to be X_C symbol, slot, sub-slot, millisecond, or the like.

(C-1) A communication apparatus 20 which is to transmit a CSI report need not assume that, in a case where the CSI report is triggered via PDCCH/PSCCH, a PSSCH/PSFCH/PUCCH/PUSCH for the CSI report is scheduled in a time gap (T_C) shorter than X_C from the above PDCCH/PSCCH. Namely, in a case where the communication apparatus 20 which is to transmit a CSI report receives a trigger for a CSI report via PDCCH/PSCCH and thereafter transmits PSSCH/PSFCH/PUCCH/PUSCH for the CSI report, a time gap T_C between the PDCCH/PSCCH and the PSSCH/PSFCH/PUCCH/PUSCH is to be longer than or equal to the processing time X_C. In a case where the communication apparatus 20 which is to receive a CSI report transmits a trigger for the CSI report via PSCCH and thereafter receives the CSI report via PSSCH/PSFCH, the time gap T_C between the PSCCH and the PSSCH/PSFCH is to be longer than or equal to the processing time X_C.

(C-2) The communication apparatus 20 which is to transmit a CSI report may defer, after receiving a trigger for the CSI report via PDCCH/PSCCH, transmission of a CSI report triggered by the PDCCH/PSCCH until the elapsed time becomes longer than or equal to X_C. In this case, units of deferring the CSI report may be slots, symbols, sub-slots, milliseconds, or the like. The communication apparatus 20 which is to receive a CSI report may assume that, after transmitting a trigger for the CSI report via PSCCH, a reception of the CSI report is at a time point at which the elapsed time becomes longer than or equal to X_C.

(C-3) The communication apparatus 20 which is to transmit a CSI report need not perform CSI reporting triggered by PDCCH/PSCCH in a time gap (T_B) shorter than X_C after receiving the trigger for the CSI report via the PDCCH/PSCCH. The communication apparatus 20 which is to receive a CSI report may assume that the communication apparatus 20 does not receive the CSI report in the time gap shorter than X_C after transmitting the trigger of the CSI report via the PSSCH.

(C-4) The above X_C may be the same as CSI computation time (C-4-1). In this case, the implementation of the communication apparatus 20 becomes easy. Alternatively, the above X_C may be larger or smaller than CSI computation time (C-4-2). In this case, for example, additional timing offset from the CSI computation time may be defined/(pre)configured. (C-4-3) Additionally, the above X_C may be defined by a technical specification document, or may be (pre)configured. (C-5) In a case where the communication apparatus 20 which is to transmit a CSI report receives a trigger for the CSI report via PDCCH/PSCCH, and when the PSSCH/PSFCH/PUCCH/PUSCH for the CSI report is scheduled in the time gap (T_C) shorter than X_C from the reception of the PDCCH/PSCCH, the communication apparatus 20 need not assume to update a CSI for the above CSI report. The communication apparatus 20 which is to receive a CSI report may assume that, after the communication apparatus 20 transmits the trigger for the CSI report via PSSCH, a CSI is not updated in the CSI report received in the time gap shorter than X_C.

Figure 16:
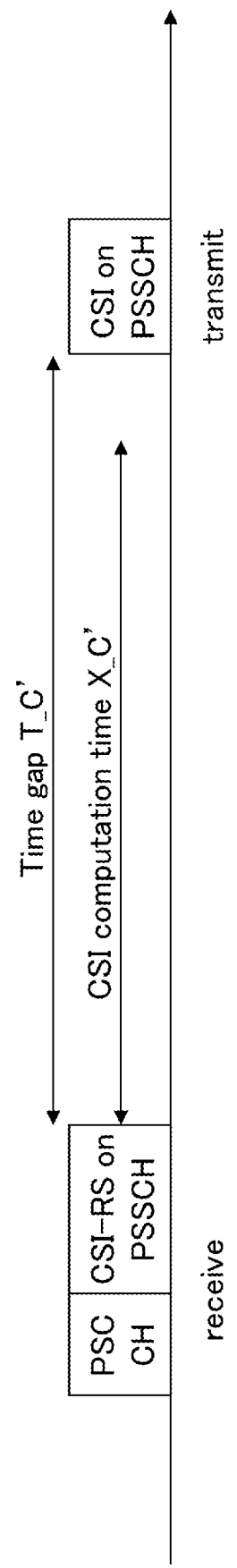
FIG. 16 is a diagram illustrating an example in which a time for a communication apparatus, after receiving sidelink CSI-RS, to transmit data on PSSCH/PSFCH for reporting CSI is X_C.

In a case where the communication apparatus 20 receives sidelink CSI-RS and transmits PSSCH/PSFCH/PUCCH/PUSCH for reporting a CSI measured (calculated) based on the sidelink CSI-RS, as illustrated in FIG. 16, a processing time for the communication apparatus 20, after the communication apparatus 20 receives the sidelink CSI-RS, to transmit data on PSSCH/PSFCH/PUCCH/PUSCH for reporting the CSI is assumed to be X_C' symbol, slot, sub-slot, millisecond, or the like.

(C'-1) The communication apparatus 20 which is to transmit a CSI report need not assume that, in a case where a CSI report is triggered via PDCCH/PSCCH, the communication apparatus 20 transmits the PSSCH/PSFCH/PUCCH/PUSCH for the CSI report in the time gap (T_C') shorter than X_C' after receiving the sidelink CSI-RS for calculating the CSI to be transmitted in the CSI report. Namely, in a case where the communication apparatus 20 receives a trigger for a CSI report via PDCCH/PSCCH, and transmits PSSCH/PSFCH/PUCCH/PUSCH for the CSI report after receiving a sidelink CSI-RS for calculating a CSI to be transmitted in the CSI report, a time gap T_C' between the sidelink CSI-RS and the PSSCH/PSFCH/PUCCH/PUSCH is to be longer than or equal to the processing time X_C'. In a case where the communication apparatus 20 which is to receive a CSI report transmits CSI-RS via PSCCH and thereafter receives PSSCH/PSFCH including a CSI report measured (calculated) based on the sidelink CSI-RS, the time gap T_C' between the PSCCH and the PSSCH/PSFCH is to be longer than or equal to the processing time X_C'.

(C'-2) The communication apparatus 20 which is to transmit a CSI report may defer the transmission of the CSI report measured (calculated) based on the sidelink CSI-RS until the elapsed time becomes longer than or equal to X_C' after receiving the sidelink CSI-RS. In this case, units of deferring data transmission on PSSCH/PSFCH may be slots, symbols, sub-slots, milliseconds, or the like. The communication apparatus 20 which is to receive a CSI report may assume that, after transmitting sidelink CSI-RS via PSCCH, reception of a CSI report measured (calculated) based on the sidelink CSI-RS is at a time point at which the elapsed time becomes longer than or equal to X_C'.

(C'-3) The communication apparatus 20 which is to transmit a CSI report need not transmit the CSI report measured (calculated) based on sidelink CSI-RS in the time gap (T_B) shorter than X_C' after receiving the sidelink CSI-RS. The communication apparatus 20 which is to receive a CSI report may assume that the communication apparatus 20 does not receive a CSI report measured (calculated) based on the sidelink CSI-RS in the time gap shorter than X_C' after transmitting the sidelink CSI-RS.

(C'-4) The above X_C' may be the same as CSI computation time (C'-4-1). In this case, the implementation of the communication apparatus 20 becomes easy. Alternatively, the above X_C' may be larger or smaller than CSI computation time (C'-4-2). In this case, for example, additional timing offset from the CSI computation time may be defined/(pre)configured. (C'-4-3) Additionally, the above X_C' may be defined by a technical specification document, or may be (pre)configured. (C'-5) In a case where the communication apparatus 20 which is to transmit a CSI report receives a trigger for the CSI report via PDCCH/PSCCH, and receives a sidelink CSI-RS for calculating a CSI to be transmitted in the CSI report, and in a case where the PSSCH/PSFCH/PUCCH/PUSCH for the CSI report is scheduled in the time gap shorter than X_C (time gap T_C) from reception of the sidelink CSI-RS, the communication apparatus 20 which is to transmit a CSI report need not assume that a CSI is updated for the CSI report. The communication apparatus 20 which is to receive a CSI report may assume that, in a case where the communication apparatus 20 transmits a trigger for the CSI report via PSSCH and transmits sidelink CSI-RS for calculating CSI to be received in the CSI report, a CSI is not updated in the CSI report received in the time gap shorter than X_C from the transmission of the sidelink CSI-RS.

(Proposal on CSI Computation Time)

With regard to NR-Uu of Release 15, a CSI processing unit (CPU) is defined. For each CSI report, a ratio of using (occupying) a CSI processing unit is defined. It is defined that, if a demand for a CSI report exceeds the amount that can be processed by the CSI processing unit, the communication apparatus 20 does not update CSIs beyond the quantity that can be processed by the CSI processing unit.

The above idea can be applied to NR sidelink communication.

(C-5) The restrictions on the CSI report by the CSI processing unit are also applied to sidelink communication. The communication apparatus 20 need not assume that CSI reports beyond the processing capability N'_CPU of the CSI processing unit are requested by a single trigger for CSI reports. In a case where CSI reports beyond the processing capability N'_CPU of the CSI processing unit are requested, the communication apparatus 20 need not update CSIs with lower priorities.

(C-5-1) N'_CPU may be defined to be a parameter that is the same as N_CPU defined for NR-Uu. In this case, if a summation of processing quantity of CSI reports in NR-Uu and processing quantity of sidelink CSI reports exceeds N_CPU, the communication apparatus 20 need not update CSIs with lower priorities.

(C-5-2) Alternatively, N'_CPU may be configured only for processing of sidelink CSI, separately from processing of CSI reports in NR-Uu. In this case, N_CPU may be configured only for processing of CSI reports in NR-Uu.

(C-5-3) The same value as the configured value of N_CPU may be configured for the value of N'_CPU.

(C-5-4) A value different from the configured value of N_CPU may be configured for the value of N'_CPU.

The timing of CSI reports need not be scheduled, and may depend on the communication apparatus 20. In this case, it is advantageous to find whether the triggering of a CSI report has been successfully made or not.

Figure 17:
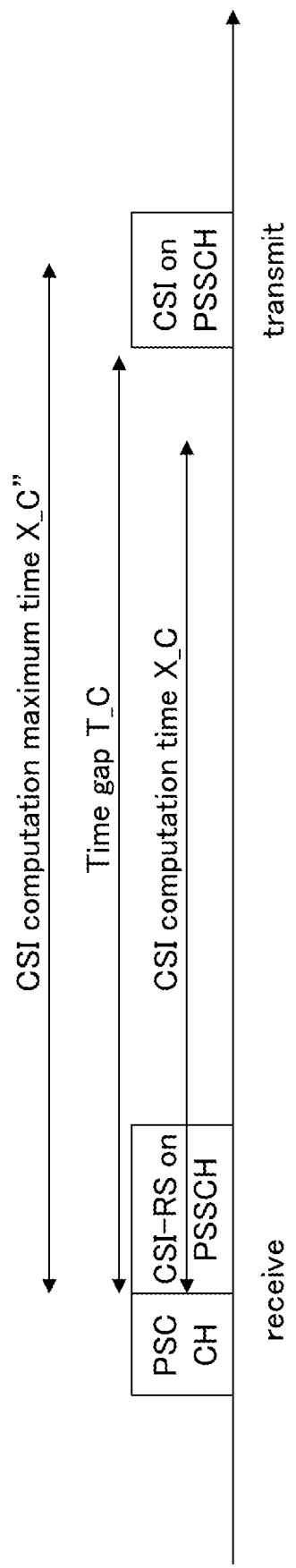
FIG. 17 is a diagram illustrating an example of a time for a communication apparatus, after receiving a signal on PSCCH, to transmit data on PSSCH/PSFCH for reporting CSI.

(C-6) A maximum time X_C" for reporting CSI is defined. In this case, a time gap T_C for the communication apparatus 20, after the communication apparatus 20 receives PDCCH/PSCCH for triggering a CSI report, to transmit PSSCH/PSFCH for transmitting the triggered CSI report satisfies X_C<time gap T_C<X_C" as illustrated in FIG. 17. In this case, if the communication apparatus 20 itself has determined PSSCH/PSFCH for reporting CSI, and a time gap between PDCCH/PSCCH triggered the CSI report and the PSCCH/PSFCH is more than X_C" symbols, slots, sub-slots, milliseconds, or the like, the communication apparatus 20 need not assume that the CSI report is transmitted/received in a time gap longer than or equal to X_C" (C-6-1). The communication apparatus 20 which triggered a sidelink CSI report may assume that the receiving communication apparatus 20 has not received a trigger for the sidelink CSI report (C-6-2).

(Proposal on Item 7)

Figure 18:
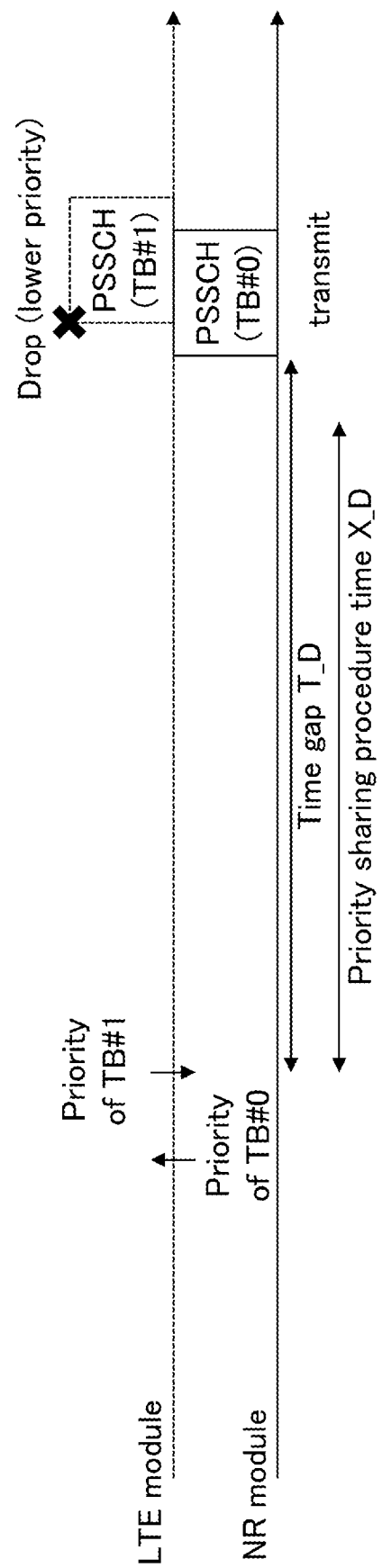
FIG. 18 is a diagram illustrating an example in which, in a case where a time gap T_D for sharing priorities of transmission/reception of LTE sidelink and transmission/reception of NR sidelink is longer than or equal to a time X_D for providing a priority of each RAT to another RAT, a packet of a higher priority is transmitted/received.

In a case where the communication apparatus 20 includes an LTE sidelink module and an NR sidelink module, and an overlap between LTE sidelink transmission and NR sidelink transmission or an overlap between transmission/reception of LTE and reception/transmission of NR occurs in the communication apparatus 20, and a time gap (T_D) for sharing priority between transmission/reception of sidelink in LTE and transmission/reception of sidelink in NR is longer than or equal to a time X_D for providing a priority of each RAT to another RAT, a packet of a high priority is transmitted/received (FIG. 18). If T_D<X_D is satisfied, a packet to be transmitted depends on the implementation of the communication apparatus 20.

(Device Configuration)

Next, a functional configuration example of each of the base station 10 and the communication apparatus 20 that execute the processes and the operation described so far is described.

<Base Station 10>

Figure 19:
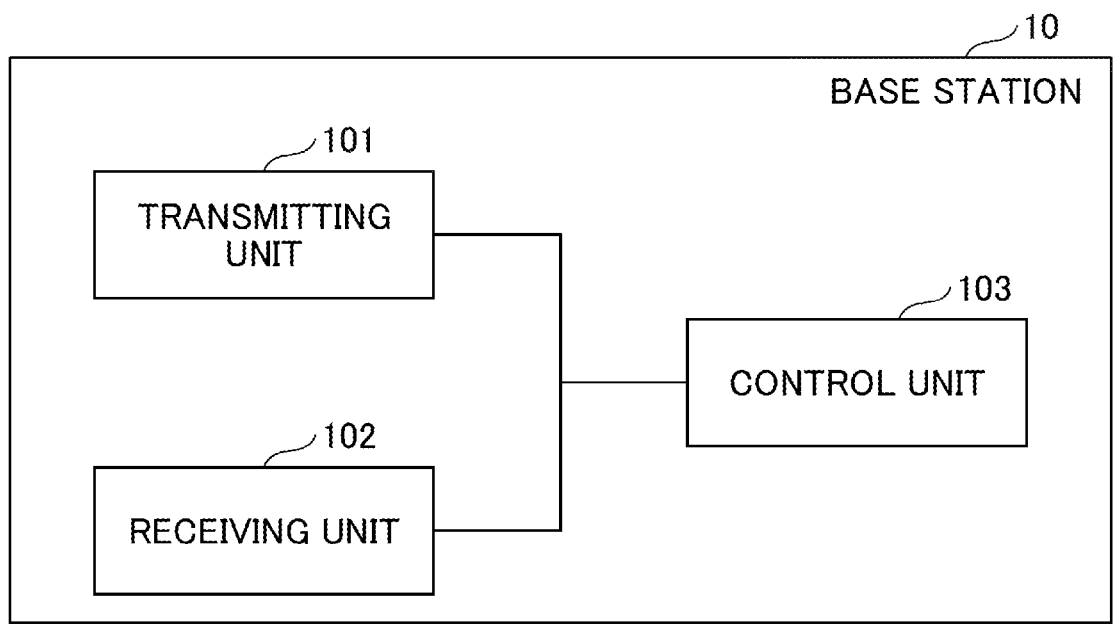
FIG. 19 is a diagram illustrating an example of a functional configuration of a base station according to an embodiment.

FIG. 19 is a diagram illustrating an example of a functional configuration of the base station 10. As illustrated in FIG. 19, the base station 10 includes a transmitting unit 101, a receiving unit 102, and a control unit 103. The functional configuration illustrated in FIG. 19 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the communication apparatus 20 side and transmitting the signal wirelessly. The receiving unit 102 has a function of receiving various types signals transmitted from the communication apparatus 20 and acquiring, for example, information of an upper layer from the received signals. Furthermore, the receiving unit 102 has a function of measuring the received signal and acquiring a quality value.

The control unit 103 controls the base station 10. The function of the control unit 103 related to transmission may be included in the transmitting unit 101, and the function of the control unit 103 related to reception may be included in the receiving unit 102.

<Communication Apparatus 20>

Figure 20:
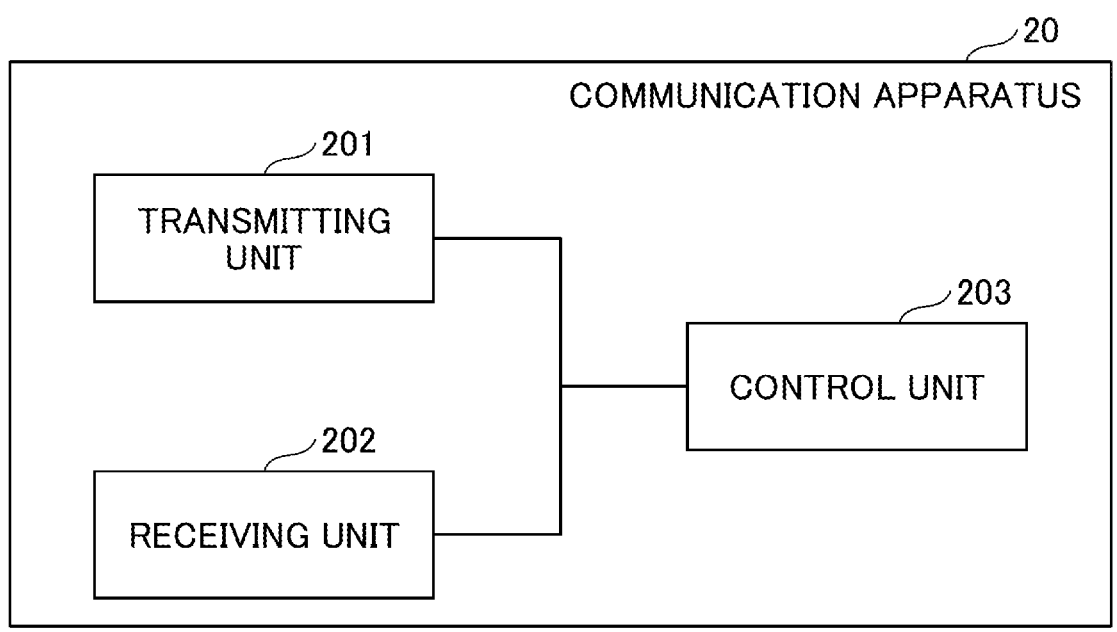
FIG. 20 is a diagram illustrating an example of a functional configuration of a communication apparatus according to an embodiment.

FIG. 20 is a diagram illustrating an example of a functional configuration of the communication apparatus 20. As illustrated in FIG. 20, the communication apparatus 20 includes a transmitting unit 201, a receiving unit 202, and a control unit 203. The functional configuration illustrated in FIG. 20 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the communication apparatus 20 may be the communication apparatus 20A on the transmission side or the communication apparatus 20B on the reception side. Furthermore, the communication apparatus 20 may be a scheduling communication apparatus 20.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The control unit 203 controls the communication apparatus 20. Note that, the function of the control unit 203 related to transmission may be included in the transmitting unit 201, and the function of the control unit 203 related to reception may be included in the receiving unit 202.

When the receiving unit 202 of the communication apparatus 20 receives data via PSSCH and the transmitting unit 201 transmits a control signal including HARQ-ACK corresponding to the PSSCH via PSFCH, the control unit 203 of the communication apparatus 20 may assume that transmission of PSFCH is not (pre)configured or scheduled in a time interval (time gap T_A) shorter than X_A after the receiving unit 202 receives data via PSSCH.

After the receiving unit 202 of the communication apparatus 20 receives data via PSSCH, the control unit 203 may defer transmission of PSFCH until elapsed time becomes longer than or equal to X_A. In this case, units of deferring the transmission of PSFCH may be slots, symbols, sub-slots, milliseconds, or the like.

In a time interval (time gap T_A) that is shorter than X_A after the receiving unit 202 of the communication apparatus 20 receives data via PSSCH, the transmitting unit 201 need not perform transmission of PSFCH.

<Hardware Configuration>

The block diagrams (FIG. 19 through FIG. 20) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 21:
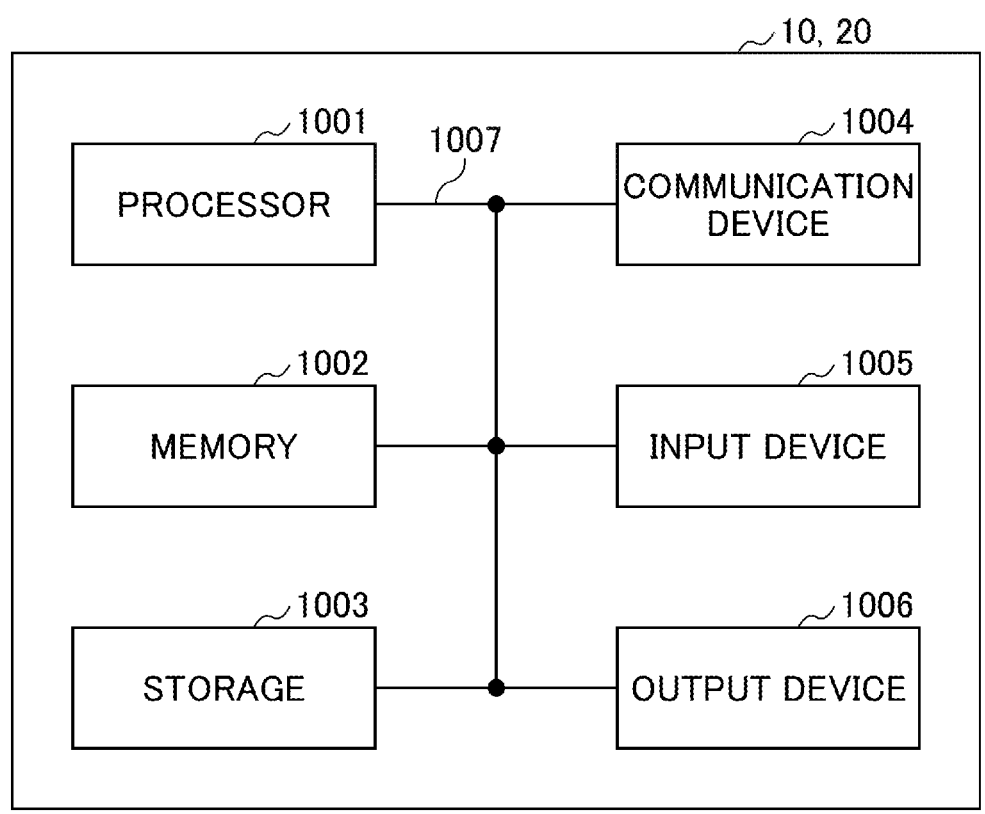
FIG. 21 is a diagram illustrating an example of a hardware configuration of the base station and the communication apparatus according to an embodiment.

For example, the communication apparatus 20 and the base station 10 in an embodiment of the present invention may function as a computer for performing a process of the embodiments. FIG. 21 is a diagram illustrating an example of a hardware configuration of the communication apparatus 20 and the base station 10 according to an embodiment. Each of the communication apparatus 20 and the base station 10 described above may be physically configured as a computer device including a processor 1001, a memory 1002, a storage 1003, a communication apparatus 1004, an input device 1005, an output device 1006, a bus 1007, and the like.

In the following description, the term "device" can be replaced with a circuit, device, unit, or the like. The hardware configuration of each of the communication apparatus 20 and the base station 10 may be configured to include one or more of devices represented by 1001 through 1006, which are depicted, or may be configured without including some devices.

Each function in each of the communication apparatus 20 and the base station 10 is implemented such that predetermined software (program) is read on hardware such as the processor 1001, the memory 1002 and the like, and the processor 1001 performs an operation and controls communication by the communication apparatus 1004 and at least one of reading and writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, data, or the like from at least one of the storage 1003 and the communication apparatus 1004 out to the memory 1002, and executes various types of processes according to them. A program causing a computer to execute at least some of the operations described in the above embodiments is used as the program. For example, the control unit 203 of the communication apparatus 20 may be implemented by a control program which is stored in the memory 1002 and operates on the processor 1001, and another functional block may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 may also be referred to as a "register," a "cache," a "main memory," or the like. The memory 1002 can store programs (program codes), software modules, or the like which are executable for carrying out the radio communication method according to an embodiment of the present disclosure.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database, a server, or any other appropriate medium including at least one of the memory 1002 and the storage 1003.

The communication apparatus 1004 is hardware (a transmitting and receiving device) for performing communication between computers via at least one of a wired network and a wireless network and is also referred to as a "network device," a "network controller," a "network card," a "communication module," or the like. The communication apparatus 1004 may be configured to include a high frequency switch, a duplexer, a filter, a frequency synthesizer, and the like to implement at least one of frequency division duplex (FDD) and time division duplex (TDD).

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected by the bus 1007 to communicate information with each other. The bus 1007 may be configured with a single bus or may be configured with different buses between the devices.

Furthermore, each of the communication apparatus 20 and the base station 10 may be configured to include hardware such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

In this specification, at least a communication apparatus and a communication method described below are disclosed.

A communication apparatus including a receiving unit configured to receive data on a sidelink shared channel; a control unit configured to generate acknowledgement information about the received data; and a transmitting unit configured to, upon detecting that a first elapsed time from receiving the data by the receiving unit until a timing for transmitting the acknowledgement information via a sidelink is shorter than a first reference time, defer the timing for transmitting the acknowledgement information via the sidelink until the first elapsed time becomes longer than or equal to the first reference time.

According to the above-described configuration, in consideration of a time required for transmission processing of acknowledgement information in a communication apparatus, the acknowledgement information can be transmitted after transmission of the acknowledgement information by the communication apparatus becomes possible.

A unit of deferring the timing for transmitting the acknowledgement information via the sidelink may be a slot, a symbol, a sub-slot, or milliseconds.

Upon detecting that a second elapsed time from receiving scheduling information for transmitting data on the sidelink shared channel by the receiving unit until a timing for transmitting the data on the sidelink shared channel by the transmitting unit is shorter than a second reference time, the transmitting unit may defer the timing for transmitting the data on the sidelink shared channel until the second elapsed time becomes longer than or equal to the second reference time.

A communication method performed by a communication apparatus, the method including receiving data on a sidelink shared channel; generating acknowledgement information about the received data; and, upon detecting that a first elapsed time from receiving the data by the receiving unit until a timing for transmitting the acknowledgement information via a sidelink is shorter than a first reference time, deferring the timing for transmitting the acknowledgement information via the sidelink until the first elapsed time becomes longer than or equal to the first reference time.

According to the above-described configuration, in consideration of a time required for transmission processing of acknowledgement information in a communication apparatus, the acknowledgement information can be transmitted after transmission of the acknowledgement information by the communication apparatus becomes possible.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the communication apparatus 20 and the base station 10 are described using the functional block diagrams, but such devices may be implemented by hardware, software, or a combination thereof. Software executed by the processor included in the communication apparatus 20 according to the embodiments of the present invention and software executed by the processor included in the base station 10 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-Wide-Band (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (Boolean: true or false), or may be performed by a comparison of numerical values (for example, a comparison with a predetermined value).

Each aspect/embodiment described in the present disclosure may be used alone, in combination, or may be switched in accordance with the execution. Further, notification of predetermined information (for example, notification of "being X") is not limited to being performed explicitly, but may be performed implicitly (for example, not notifying the predetermined information).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS: Base Station)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," "communication apparatus" and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication apparatus, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication apparatus, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of terminals (for example, which may be referred to as device-to-device (D2D) or vehicle-to-everything (V2X)). In this case, the user terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station 10 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

In a case in which "include," "including," and variations thereof are used in the present disclosure, these terms are intended to be comprehensive, similar to a term "provided with (comprising)." Further, the term "or" used in the present disclosure is intended not to be an exclusive OR.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted in similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims.

Accordingly, the description of the specification is for the purpose of illustration and does not have any restrictive meaning to the present invention.

LIST OF REFERENCE SYMBOLS 10 base station
20 communication apparatus 101 transmitting unit
102 receiving unit
103 control unit
201 transmitting unit
202 receiving unit
203 control unit
1001 processor
1002 memory
1003 storage
1004 communication apparatus
1005 input device
1006 output device

The invention claimed is:

1. A communication apparatus comprising:
   a receiver configured to receive first acknowledgement information via a Physical Sidelink Feedback Channel (PSFCH);
   a controller configured to generate second acknowledgement information corresponding to the received first acknowledgement information; and
   a transmitter configured to determine not to transmit the second acknowledgement information in an uplink if a first elapsed time from receiving the first acknowledgement information until transmitting the second acknowledgement information in the uplink is shorter than a first reference time.

2. The communication apparatus according to claim 1, wherein, if a second elapsed time from receiving scheduling information to transmit data on a sidelink shared channel until transmitting the data on the sidelink shared channel is shorter than a second reference time, a transmission of the data is not to be scheduled.

3. The communication apparatus according to claim 1, wherein the transmitter is configured to report Channel State Information (CSI) only if an elapsed time after receiving control information to trigger a CSI report is shorter than a third reference time.

4. The communication apparatus according to claim 1, wherein, if a timing for transmitting data based on a first radio access method overlaps a timing for transmitting data based on a second radio access method, the transmitter is configured to perform transmission of the data with a high priority level between the transmission of the data based on the first radio access method and the transmission of the data based on the second radio access method in a case where an elapsed time from a timing at which the communication apparatus is provided with priority levels of the transmission of the data based on the first radio access method and the transmission of the data based on the second radio access method is longer than or equal to a fourth reference time.

5. A communication method executed by a communication apparatus, the method comprising:
   receiving first acknowledgement information via a Physical Sidelink Feedback Channel (PSFCH);
   generating second acknowledgement information corresponding to the received first acknowledgement information; and
   determining not to transmit the second acknowledgement information in an uplink if a first elapsed time from receiving the first acknowledgement information until transmitting the second acknowledgement information in the uplink is shorter than a first reference time.

6. A communication system comprising:
   a first communication apparatus;
   a second communication apparatus; and
   a base station,
   wherein the first communication apparatus includes:
      a receiver configured to receive first acknowledgement information via a Physical Sidelink Feedback Channel (PSFCH);
      a controller configured to generate second acknowledgement information corresponding to the received first acknowledgement information; and
      a transmitter configured to determine not to transmit the second acknowledgement information in an uplink if a first elapsed time from receiving the first acknowledgement information until transmitting the second acknowledgement information in the uplink is shorter than a first reference time,
   wherein the second communication apparatus includes a transmitter configured to transmit the first acknowledgement information via the PSFCH, and
   wherein the base station includes a receiver configured to receive the second acknowledgement information in the uplink.

* * * * *